(12) United States Patent
Barlini et al.

(10) Patent No.: US 10,982,946 B2
(45) Date of Patent: Apr. 20, 2021

(54) SYSTEM AND METHOD FOR MEASURING MOTOR BEARINGS CONSUMPTION OF RAILWAY VEHICLES

(71) Applicant: ALSTOM Transport Technologies, Saint-Ouen (FR)

(72) Inventors: Davide Barlini, Milan (IT); Giacomo Maccalli, Novate Milanese (IT)

(73) Assignee: ALSTOM Transport Technologies, Saint-Ouen (FR)

( * ) Notice: Subject to any disclaimer, the term of this patent is extended or adjusted under 35 U.S.C. 154(b) by 203 days.

(21) Appl. No.: 16/194,151

(22) Filed: Nov. 16, 2018

(65) Prior Publication Data
US 2019/0154426 A1 May 23, 2019

(30) Foreign Application Priority Data

Nov. 22, 2017 (EP) .................................... 17306619

(51) Int. Cl.
G01B 7/14 (2006.01)
G01M 13/04 (2019.01)
(Continued)

(52) U.S. Cl.
CPC ............ *G01B 7/144* (2013.01); *F16C 17/246* (2013.01); *G01M 13/021* (2013.01);
(Continued)

(58) Field of Classification Search
CPC ........ G01B 7/144; F16C 17/246; F16C 17/24; G01M 13/021; G01M 13/028;
(Continued)

(56) References Cited

U.S. PATENT DOCUMENTS

| 4,835,467 A | 5/1989 | Gokhale |
| 6,252,395 B1 * | 6/2001 | Aoyama ................ G01D 3/032 324/207.12 |

(Continued)

OTHER PUBLICATIONS

Extended European Search Report for Application No. 17306619.2, dated Jun. 5, 2018, in 8 pages.

*Primary Examiner* — Lisa M Caputo
*Assistant Examiner* — Rose M Miller
(74) *Attorney, Agent, or Firm* — Knobbe, Martens, Olson & Bear, LLP

(57) ABSTRACT

System for measuring motor bearings consumption of railway vehicles, comprising:
a phonic wheel, arranged to be fixed to a shaft of a rotor, having a profile including an alternation of teeth and holes;
a sensor, arranged to measure a punctual air-gap between the teeth of the phonic wheel and said sensor during rotation of the shaft, said sensor generating a basic sinusoidal signal function of said profile, wherein the basic sinusoidal signal is superimposed to a modulating wave, representative of a radial motion of the shaft, the basic signal and the modulating wave forming a complete signal;
characterized in that the sensor further comprises:
a control unit arranged to measure a maximum and a minimum amplitude value of the complete signal, said maximum and minimum amplitude values representing the maximum and minimum air-gap between the phonic wheel and the sensor, and for calculating an air-gap swing value;
memory means arranged to store said air-gap swing value;
wherein said sensor is arranged to send to an external control unit said air-gap swing value when the shaft stops rotating.

13 Claims, 2 Drawing Sheets

(51) Int. Cl.
 *G01M 13/021* (2019.01)
 *F16C 17/24* (2006.01)
 *G01P 21/02* (2006.01)
 *G01P 3/481* (2006.01)
 *G01N 3/56* (2006.01)

(52) U.S. Cl.
 CPC ............ *G01M 13/04* (2013.01); *G01P 3/481* (2013.01); *G01P 21/02* (2013.01); *B60L 2200/26* (2013.01); *G01N 3/56* (2013.01)

(58) Field of Classification Search
 CPC ..... G01M 13/04; G01M 13/045; G01P 3/481; G01P 21/02; B60L 2200/26; G01N 3/56
 USPC .................................. 73/593, 587, 659, 660
 See application file for complete search history.

(56) References Cited

U.S. PATENT DOCUMENTS

| | | | | |
|---|---|---|---|---|
| 2006/0009941 A1* | 1/2006 | Motz | .................... | G01D 5/2448 |
| | | | | 702/116 |
| 2007/0090961 A1* | 4/2007 | Gerez | .................... | G01P 3/489 |
| | | | | 340/670 |
| 2018/0003073 A1* | 1/2018 | Rowe | ........................ | G01P 3/46 |
| 2019/0058428 A1* | 2/2019 | Barlini | .................... | H02P 27/08 |
| 2019/0339054 A1* | 11/2019 | Sarwar | .................. | G01M 13/04 |

\* cited by examiner

SYSTEM AND METHOD FOR MEASURING MOTOR BEARINGS CONSUMPTION OF RAILWAY VEHICLES

CROSS-REFERENCE TO RELATED APPLICATION

This application claims priority to European Patent Application No. 17306619.2 filed on Nov. 22, 2017, the disclosure of which including the specification, the drawings, and the claims is hereby incorporated by reference in its entirety.

FIELD OF THE INVENTION

The present invention relates to a system and method for measuring motor bearings consumption of railway vehicles.

BACKGROUND OF THE INVENTION

Condition Based Maintenance (CBM) for traction motors of railway vehicles is a really demanding task and it is necessary to avoid failures of the overall service, which affects the customers' opinion on reliability of the railway provider, and also to save costs for unnecessary maintenance.

Dedicated sensors are usually integrated into a system of a railway vehicle for detecting and monitoring possible failures of motors.

With reference to these failures, bearings are the components which are more likely subject to damages. In order to perform an early detection of motor bearings failures, several techniques have been implemented, which are usually based on temperature sensors, accelerometers, microphones, etc. and which usually deal with mechanical measurements.

Document U.S. Pat. No. 4,835,467 A discloses a magneto resistive sensor monitoring the passing of teeth on a rotating wheel generating a DC biased speed signal.

The main disadvantage of these systems based on mechanical measurements of motor vibrations is that it is necessary to add new sensors and in case of their failure, the system could bring-out of service the monitored motors. Electrical measurements have also been employed, such as phase current analysis, but these techniques require a powerful electronic board to perform the analysis on time.

SUMMARY OF THE INVENTION

There is therefore the need to have an innovative system and method for measuring motor bearings consumption of railway vehicles which is capable of detecting the bearing consumption without requiring additional components and using the current electronic board already installed on the train, thus overcoming the limitations of the prior art solutions.

These and other objects are achieved by a system for measuring motor bearings consumption of railway vehicles having the characteristics defined in claim 1, and by a method for measuring motor bearings consumption of railway vehicles having the characteristics defined in claim 5.

Preferred embodiments of the invention are the subject matter of the dependent claims, whose content is to be understood as forming an integral part of the present description.

BRIEF DESCRIPTION OF THE DRAWINGS

Further characteristics and advantages of the present invention will become apparent from the following description, provided merely by way of non-limiting example, with reference to the enclosed drawings, in which.

DETAILED DESCRIPTION OF THE PREFERRED EMBODIMENTS

Briefly, the system of the present invention comprises a phonic wheel fixed to a shaft of a rotor of a motor of a railway vehicle, this shaft rotating thanks to a plurality of bearings, and a speed sensor fixed to a static part of the motor itself and facing the phonic wheel.

If the bearings, due to the rotational motion of the shaft, start consuming, a radial motion of the shaft towards the static part of the motor occurs, therefore, also the phonic wheel moves approaching or separating from the sensor.

The rotor vibration produces a well-known air-gap variation between the teeth of the phonic wheel and the sensor, and this variation produces a modulation on a sinusoidal wave measured by the sensor.

In fact the sensor, which is usually used, in system of the prior art, for measuring the speed of the phonic wheel, and therefore indirectly the speed of the railway vehicle, produces a quasi-sinusoidal wave which is function of the alternating passage of teeth and holes of the phonic wheel in front of the sensor.

In prior art systems, the sinusoidal wave is squared by an electronic unit of the sensor itself, so that the frequency of the squared wave is related to the speed of the rotor and, in turn, to the speed of the railway vehicle.

Within the speed sensor are usually integrated two physical sensors, one for each output channel of the speed sensor, for transmitting, to an external control unit of the railway vehicle controlling the railway vehicle itself, the squared waves coming from these sensors, which are respectively shifted of 90 degrees, for detection of the rotational direction of the shaft also.

The core of the system and method of the present invention is to use the speed sensor usually used for detecting the speed of the rotor for also detecting the bearings consumption, by using the same output channels for transmitting both speed and information relative to such consumption to the external control unit.

Figure 1:
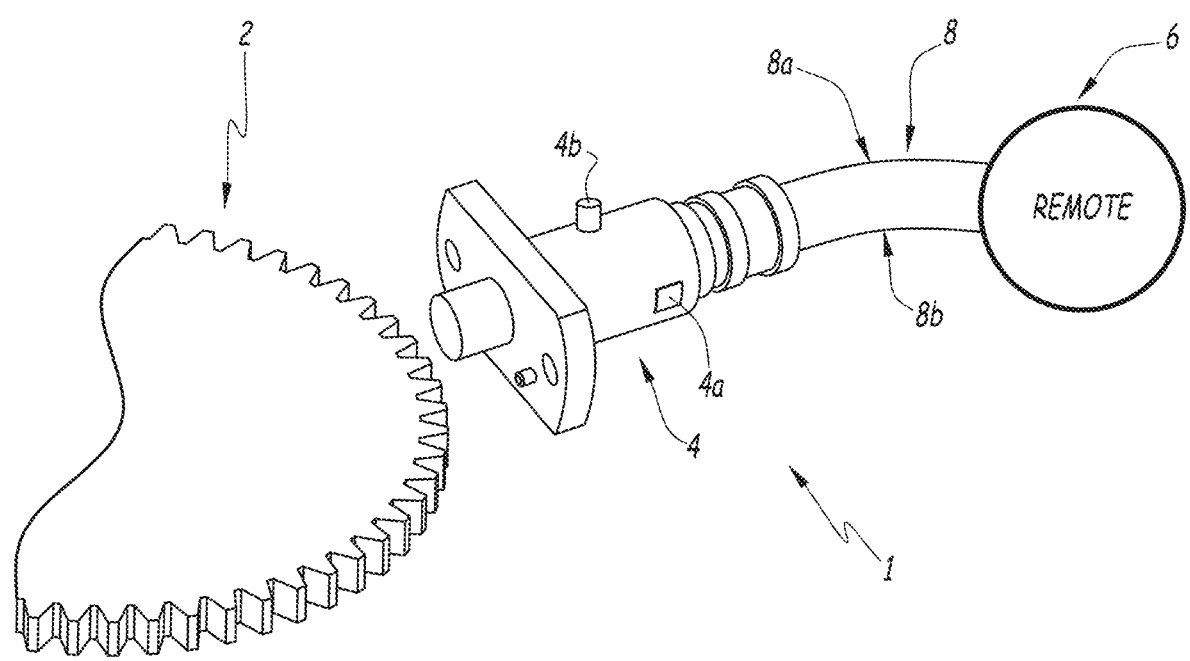
FIG. 1 shows a schematic view of a system for measuring motor speed and bearings consumption of railway vehicles according to the present invention.

FIG. 1 shows a system 1 for measuring motor bearings consumption of railway vehicles which comprises a phonic wheel 2, arranged for being fixed to a shaft of a rotor, the phonic wheel 2 having a profile including an alternation of teeth and holes. The phonic wheel 2 faces a magneto-resistive sensor 4, arranged for measuring the punctual air-gap between the teeth of the phonic wheel 2 and the sensor 4 itself during rotation of the shaft and the associated phonic wheel 2.

In particular, the sensor 4 generates, in a manner per se known, a basic sinusoidal signal which varies as a function of the phonic wheel 2 profile which passes in front of the sensor 4 itself (a hole or a tooth), said basic sinusoidal signal being arranged to be squared by the sensor 4 itself, as above disclosed, to measure the rotational speed of the shaft of the rotor.

The basic sinusoidal signal is generally superimposed to a modulating wave, representative of the radial motion of the shaft, therefore, representative of the variation of the air-gap between the sensor 4 itself and the phonic wheel 2 profile. In the following, a complete signal is therefore the combination of the basic sinusoidal signal and the modulating wave and is generated by the sensor 4.

The sensor 4 comprises a control unit 4a arranged to measure, starting from the complete signal, a maximum and a minimum amplitude value of the complete signal, said values representing the maximum and minimum air-gap values between the phonic wheel 2 and the sensor 4.

The control unit 4a is also arranged to calculate an air-gap swing value for example as difference between the maximum and the minimum value of air-gap or by means of other elaboration which provides air-gap swing information.

The sensor 4 further comprises memory means 4b arranged to store such air-gap swing value once a higher value is measured with respect to the previous one recorded. In addition also the frequency speed which corresponds to such air-gap swing value is stored in the memory means 4b.

When the shaft stops rotating, the sensor 4 is then arranged to transmit to an external control unit 6 controlling the railway vehicle said air-gap swing value and corresponding speed values, as detailed here below.

Figure 2:
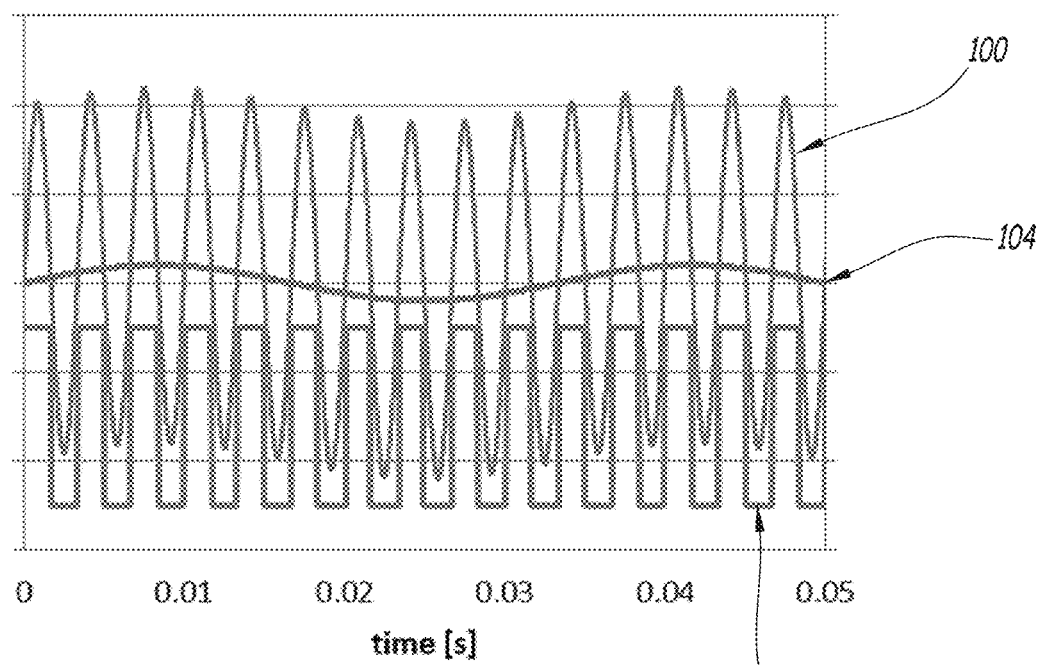
FIG. 2 shows a graph of curves relative to the measurements of the sensor.
Figure 3:
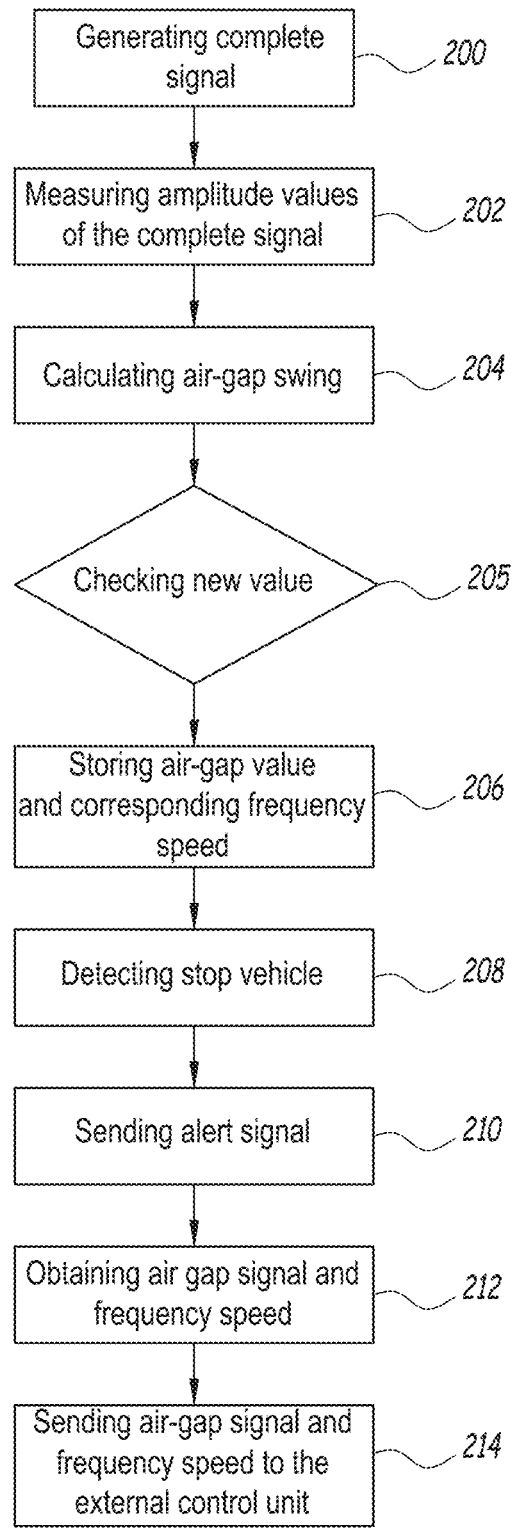
FIG. 3 shows a block diagram of the steps of a method for measuring motor bearings consumption of railway vehicles according to the present invention.

FIG. 2 shows a graph showing a first curve 100 representative of the complete sinusoidal signal (measurement of the sensor), a second curve 102 representative of the squared signal usually generated by the sensor 4 and a third curve 104 representative of the air-gap oscillation. The internal control unit 4a is also arranged to perform a method for measuring motor bearings consumption of railway vehicles according to the present invention, which will be disclosed in the following with reference to FIG. 3, which shows a block diagram of the steps to be performed.

In a first step 200, the sensor 4 generates a complete signal over time and, at step 202, the control unit 4a measures, in progressive manner, the maximum and the minimum amplitude values of the complete signals during movement of the railway vehicle. In a next step 204 the control unit 4a calculates, as above indicated, the air-gap swing value between the phonic wheel 2 and the sensor 4.

At step 205, control unit 4a checks the air-gap swing value, in particular, it compares the value calculated at step 204 with respect to a value previously stored into the memory means 4b. In case of the air-gap swing value calculated at step 204 is higher than the previous one, control unit 4a, at step 206, stores the air-gap swing value and advantageously the corresponding frequency speed value into the memory means 4b.

If, in successive time instants, the maximum and the minimum amplitude values of the complete signals changes, the above steps are repeated so as to update the air-gap swing value and advantageously its corresponding frequency speed.

The external control unit 6 is arranged to receive from the sensor 4, through a connection 8, a squared signal representative of the speed of the rotor as in prior art systems. In particular, the connection 8 comprises two channels 8a and 8b through which the sensor 4 transmits to the external control unit 6, during movement of the railway vehicle, the two squared waves coming from the sensor 4, as above disclosed.

Returning to FIG. 3, in a next step 208, the control unit 4a detects a stop of the railway vehicle by detecting an interruption of the measuring function of the sensor 4, i.e. by detecting that the sensor 4 is not measuring any more the complete signal: this means that the rotor shaft has stopped due to the stop of the railway vehicle.

In particular, the control unit 4a checks if the sensor 4 does not measure the complete signal for a predetermined time interval.

Preferably, the control unit 4a includes a counter, arranged to start counting for a predetermined time interval each time the sensor 4 stops generating the complete signal.

After the predetermined time interval has elapsed, at step 210, an alert signal is sent to the external control unit 6 through the connection 8, to inform the external control unit 6 that a bearing consumption-related data transmission is going to start.

Due to the fact that the external control unit 6 is arranged to receive a squared signal, the alert signal is advantageously a squared signal, corresponding to the squared signal whose frequency corresponds to the maximum speed of the rotor.

When the sensor 4 stops measuring the complete signal, the external control unit 6 is also arranged in a manner per se known to correspondingly detect that the sensor 4 has stopped and that, therefore, the railway vehicle has stopped.

As a consequence when, after the stop of the railway vehicle, the external control unit 6 receives the alert signal which corresponds to the maximum speed of the train, it recognizes that this is the alert signal because the railway vehicle cannot immediately reach its maximum speed starting from an idle position.

The alarm signal is sent either through the first channel 8a or through the second channel 8b.

At this point, at step 212, the air-gap swing value is converted by the control unit 4a into an air-gap swing signal, in a manner per se known, and at step 214, the sensor 4 sends to external control unit 6, through the channel 8a or on the channel 8b, said air-gap swing signal.

Due to the fact that the external control unit 6 is arranged to receive squared signals, also the air-gap swing signal is advantageously a squared signal whose frequency corresponds to the air-gap swing value.

In a preferred embodiment of the invention, the memory means 4b are arranged to store also the frequency speed value of the rotor which corresponds to the air-gap swing stored, and at step 214 this frequency speed value is also sent to the external control unit.

Advantageously, the external control unit 6, is adapted for determining bearing consumption in function of the air-gap swing signal and preferentially also of the corresponding frequency speed. Therefore, the external control unit 6 is configured for detecting and monitoring possible failures of motors related to bearings consumption.

Clearly, the principle of the invention remaining the same, the embodiments and the details of production can be varied considerably from what has been described and illustrated purely by way of non-limiting example, without departing from the scope of protection of the present invention as defined by the attached claims.

What is claimed is:

1. A system for measuring motor bearings consumption of railway vehicles, comprising:
   a phonic wheel, arranged to be fixed to a shaft of a rotor, having a profile including an alternation of teeth and holes;
   a sensor, arranged to measure an air-gap between the teeth of the phonic wheel and said sensor during rotation of the shaft, said sensor generating a basic sinusoidal signal function of said profile, wherein the basic sinusoidal signal is superimposed to a modulating wave, representative of a radial motion of the shaft, the basic signal and the modulating wave forming a complete signal;
wherein the sensor further comprises:
a control unit arranged to:
   measure a maximum and a minimum amplitude value of the complete signal, said maximum and minimum amplitude values representing the maximum and minimum air-gap between the phonic wheel and the sensor,
   determine when the shaft of the rotor has stopped rotating, and
   calculate an air-gap swing value; and
memory means arranged to store said air-gap swing value;
wherein said sensor is arranged to send to an external control unit said air-gap swing value when the shaft stops rotating, said external control unit being arranged to determine the motor bearing consumption in function of said air-gap swing value.

2. The system of claim 1, wherein the sensor is a magneto-resistive sensor.

3. The system of claim 1, wherein the control unit is arranged to measure a frequency of the complete signal, and the memory means are further arranged to store a frequency of the complete signal related to the speed of the phonic wheel corresponding to the air-gap swing value.

4. The system of claim 3, wherein the sensor is further arranged to send said frequency of the complete signal related to the speed of the phonic wheel.

5. A method for measuring motor bearings wearing of railway vehicles comprising the steps of:
   providing a system according to claim 1;
   generating a complete signal representative of the rotation of the phonic wheel and of a radial motion of the shaft of the rotor;
   calculating, starting from said complete signal, the air-gap swing value, and storing it within the sensor;
   detecting a stop of the rotation of the shaft;
   transmitting to the external control unit said air gap swing value; and
   determining the motor bearing consumption in function of said air-gap swing value.

6. The method according to claim 5, further including the step of comparing the calculated air-gap swing value with respect to a value previously stored into the memory means.

7. The method according to claim 5, wherein the step of calculating the air-gap swing value comprises the steps of:
   measuring, in progressive manner, the maximum and the minimum amplitude values of the complete signal;
   calculating the air-gap swing value as difference of said maximum and minimum amplitude values.

8. The method according to claim 5, wherein the step of detecting a stop of the rotation of the shaft comprises detecting that the sensor does not measure the complete signal for a predetermined time interval.

9. The method according to claim 5, wherein the step of transmitting to the external control unit the air-gap swing value comprises the steps of:
   sending an alert signal to the external control unit to inform the external control unit that a bearing wearing-related data transmission is going to start;
   converting the air-gap swing value into an air-gap swing signal;
   sending the air-gap swing signal to external control unit.

10. The method according to claim 9, wherein the alert signal is a squared signal.

11. The method according to claim 10, wherein the frequency of the alert signal corresponds to a maximum speed of the rotor.

12. The method according to claim 9, wherein the air-gap swing signal is a squared signal.

13. The method according to claim 12, wherein the frequency of the air-gap swing signal corresponds to the air-gap swing value.

* * * * *